No. 686,568. Patented Nov. 12, 1901.
C. F. WILLIAMS.
LATHE CHUCK.
(Application filed July 2, 1901.)
(No Model.)
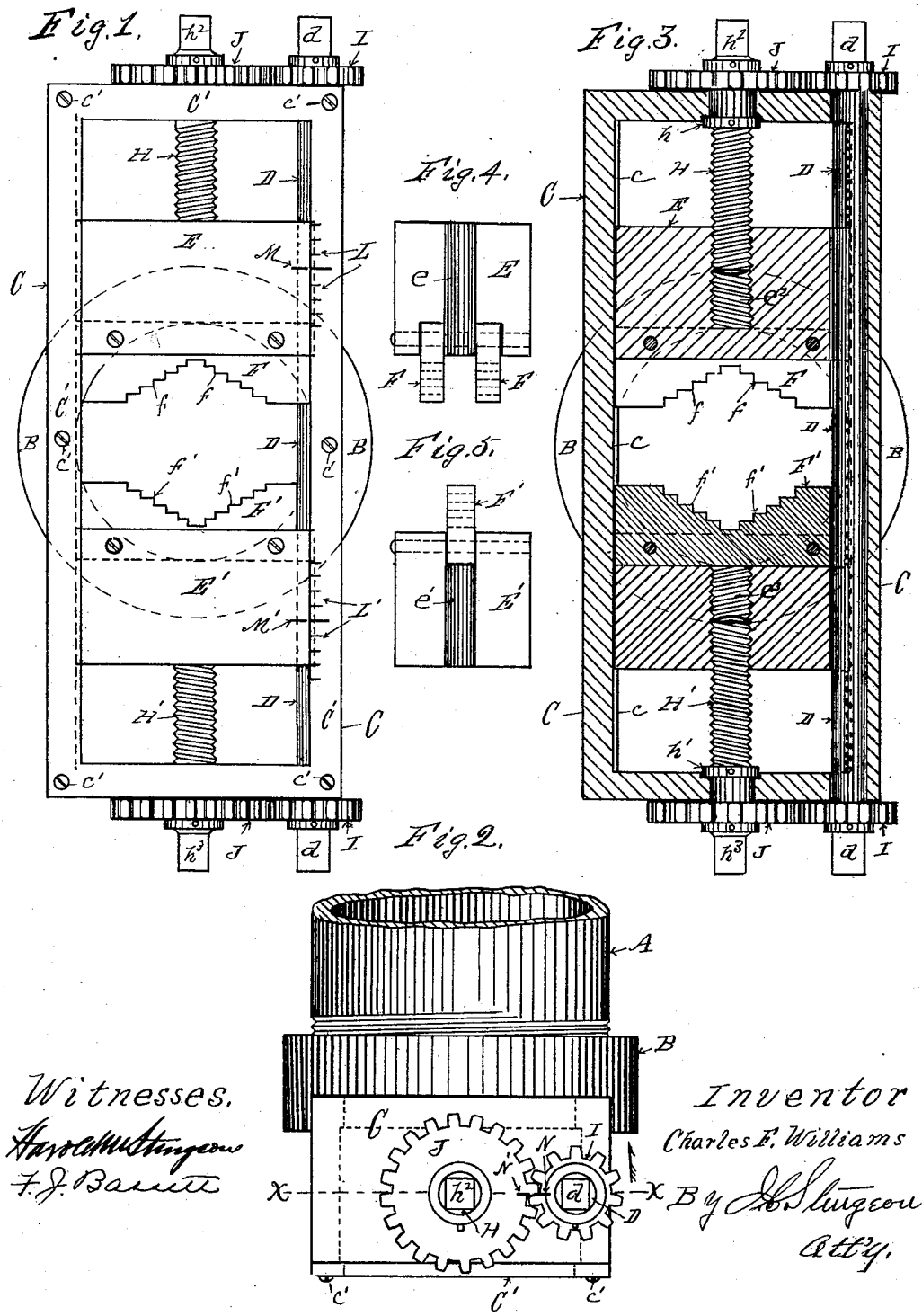
Witnesses.
Inventor
Charles F. Williams
By Sturgeon
Att'y.

UNITED STATES PATENT OFFICE.

CHARLES F. WILLIAMS, OF ELLWOOD CITY, PENNSYLVANIA.

LATHE-CHUCK.

SPECIFICATION forming part of Letters Patent No. 686,568, dated November 12, 1901.

Application filed July 2, 1901. Serial No. 66,832. (No model.)

*To all whom it may concern:*

Be it known that I, CHARLES F. WILLIAMS, a citizen of the United States, residing at Ellwood City, in the county of Lawrence and State of Pennsylvania, have invented certain new and useful Improvements in Lathe-Chucks; and I do hereby declare the following to be a full, clear, and exact description of the invention, such as will enable others skilled in the art to which it appertains to make and use the same, reference being had to the accompanying drawings, and to the letters of reference marked thereon, forming a part of this specification.

My invention relates to improvements in lathe-chucks, and particularly to chucks for holding pipe and other cylindrical work.

The objects of my invention are to so construct a chuck that the jaws can be operated either in unison with each other or independently of each other with equal facility and so that the jaws can with equal facility be operated in unison toward and from the center of the axis of the shaft upon which the chuck is mounted or can be adjusted to operate in unison toward and from a center at one side of the center of the shaft. These and other features of my invention are hereinafter fully set forth and described, and illustrated in the accompanying drawings, in which—

Figure 1 is a front view in elevation of my improved lathe-chuck. Fig. 2 is an end view in elevation of the same. Fig. 3 is a longitudinal section of the same on the line $x\ x$ in Fig. 2. Figs. 4 and 5 are end views in elevation of the movable chuck-blocks and jaws therein.

In the drawings thus illustrating my invention, A is a hollow lathe-mandrel, and B a collar on the back of the chuck-frame C, adapted to be screwed upon the lathe-mandrel. The chuck-frame C is rectangular in shape, extending equal distances each way from the collar B thereon, and in one side of the frame C there is a shaft D, which extends the entire length thereof. In the frame C, I place jaw-blocks E E', adapted to fit into slides $c$ on the inner faces of the sides of the frame C and provided with depressions $e\ e'$ to embrace the shaft D, where they are retained by means of a face-plate C', secured by screws $c'$ to the front of the frame C, so that the jaw-blocks E E' will slide freely therein. In the jaw-block E, I secure jaws F F, provided with serrations $f$, and in the jaw-block E', I secure a central jaw F', provided with serrations $f'$, adapted to pass between the jaws F F when the jaws are brought together. These jaws F F and F' shown are adapted to hold pipe; but as they are removable they can be replaced by any form of jaw desired. In the center of the jaw-blocks E and E' there are screw-threaded openings $e^2$ and $e^3$, one of which is provided with a right-hand thread and the other with a left-hand thread. Through the centers of the ends of the frame C, I place screws H H', one of which is right-hand threaded and the other left-hand threaded to fit the threaded openings $e^2$ and $e^3$ in the jaw-blocks E and E'. On the screws H H' I secure collars $h$ and $h'$, which operate against the inner faces of the frame C to prevent endwise thrust of the screws H and H', as clearly shown in Fig. 3.

The shaft D is provided with small gear-pinions I I, removably secured to its ends $d\ d$ on the outside of the ends of the frame C, and the ends $d$ of the shaft D are also squared outside of the pinions I so as to receive a wrench. On the ends $h^2\ h^3$ of the screws H and H', I secure gear-wheels J J, preferably of twice the diameter of the gear-pinions I I, so that a wrench applied to one end of the shaft D enables the operator to utilize the power of the small gear-pinions I I, exerted through the large gears J J on the screws H H'. The ends $h^2\ h^3$ of the screws H and H' outside of the gear-wheels J J are also squared so as to receive a wrench when desired. It is obvious from this construction that a wrench applied to one end of the shaft D will move the screws E and E' in unison, and a wrench applied to either end $h^2$ or $h^3$ of the screws H or H' will also move the screws H and H' in unison, but when it is desired to move the jaws F and F' independently of each other it is simply necessary to remove one of the pinions I from the shaft D.

It will also be observed that there is a scale-mark M on the jaw-block E and a scale-mark M' on the jaw-block E' and that on the face-plate C' there are scale-marks L and L', the object of these scale-marks being to facilitate the speedy adjustment of the jaw-blocks E and E', so that the jaws F and F' will operate in unison toward and from the center of the shaft upon which the chuck is mounted or toward and from a point at one side of the center of the shaft if so adjusted, as may be desired. Scale-marks N and N' are also placed upon the gear-pinions I and the gear-wheels J for the purpose of facilitating the readjustment of the removable gear-pinions I on the shaft D. It is obvious that the operator can by means of these scales and the removable pinions I on the shaft D adjust the jaws of the chuck to operate in unison toward and from any center desired or so that he can use the chuck as an independent jawed chuck, as may be desired.

I have thus shown and described a lathe-chuck embodying my invention so that others skilled in the art to which this invention appertains can utilize the same, but I do not desire to confine myself to the exact construction thereof herein shown and described, as I am aware that the same may be considerably modified without departing from the spirit of my invention.

Therefore what I claim as new, and desire to secure by Letters Patent of the United States, is—

In a lathe-chuck, the combination of a chuck-frame a longitudinal shaft in one side of said frame extending beyond the ends thereof, removable gear-pinions on the ends of said shaft, jaws moving in guides in said frame, scales on said jaws and the side of the frame, right and left hand screws for adjusting said jaws, and gear-wheels on said screws intermeshing with the removable gear-pinions on said shaft, substantially as and for the purpose set forth.

In testimony whereof I affix my signature in presence of two witnesses.

CHARLES F. WILLIAMS.

Witnesses:
W. MARSHALL SELKIRK,
S. P. TURNER.